United States Patent
Seong et al.

(10) Patent No.: US 8,318,270 B2
(45) Date of Patent: Nov. 27, 2012

(54) LIQUID CRYSTAL DISPLAY PANEL AND METHOD OF MANUFACTURING THE LIQUID CRYSTAL DISPLAY PANEL

(75) Inventors: Dong-Gi Seong, Seongnam-si (KR); Jae-Jin Lyu, Yongin-si (KR); Seung-Beom Park, Seoul (KR); Myeong-Ha Kye, Seoul (KR); Min-Goo Seok, Yongin-si (KR); Min-Hee Kim, Ansan-si (KR)

(73) Assignee: Samsung Display Co., Ltd. (KR)

( * ) Notice: Subject to any disclaimer, the term of this patent is extended or adjusted under 35 U.S.C. 154(b) by 764 days.

(21) Appl. No.: 12/537,522

(22) Filed: Aug. 7, 2009

(65) Prior Publication Data
US 2010/0231845 A1 Sep. 16, 2010

(30) Foreign Application Priority Data
Mar. 13, 2009 (KR) ........................ 10-2009-0021522

(51) Int. Cl.
*C09K 19/00* (2006.01)
*C09K 19/52* (2006.01)
*C09K 19/06* (2006.01)
*C09K 19/30* (2006.01)
*G02F 1/1337* (2006.01)

(52) U.S. Cl. ...... 428/1.1; 428/1.2; 428/1.3; 252/299.01; 252/299.6; 252/299.63; 349/1; 349/56; 349/123; 349/182; 349/187

(58) Field of Classification Search .................. 428/1.1, 428/1.2, 1.3; 252/299.01, 299.6, 299.63; 349/1, 56, 123, 182, 187
See application file for complete search history.

(56) References Cited

U.S. PATENT DOCUMENTS
2011/0032465 A1* 2/2011 Seong et al. .............. 252/299.01
2011/0096259 A1* 4/2011 Lee et al. ........................ 349/41
* cited by examiner Primary Examiner — Geraldina Visconti
(74) Attorney, Agent, or Firm — Cantor Colburn LLP

(57) ABSTRACT

A liquid crystal display ("LCD") panel includes a first substrate including a pixel electrode defining pixel areas, a first alignment layer disposed on the pixel electrode and a first reactive mesogen layer disposed on the first alignment layer, a second substrate including a common electrode layer disposed on an entire portion of the second substrate facing the first substrate, a second alignment layer disposed on the common electrode layer and a second reactive mesogen layer disposed on the second alignment layer, and a liquid crystal layer disposed between the first and second substrates and including a first liquid crystal compound represented by Chemical Formula 1, a second liquid crystal compound represented by Chemical Formula 2 and a third liquid crystal compound represented by Chemical Formula 3:

Chemical Formula 1

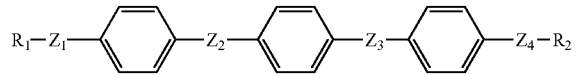

Chemical Formula 2

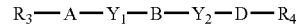

Chemical Formula 3

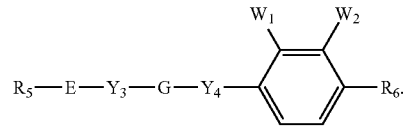

17 Claims, 3 Drawing Sheets

LIQUID CRYSTAL DISPLAY PANEL AND METHOD OF MANUFACTURING THE LIQUID CRYSTAL DISPLAY PANEL

This application claims priority to Korean Patent Application No. 2009-0021522, filed on Mar. 13, 2009, and all the benefits accruing therefrom under 35 U.S.C. §119, the content of which in its entirety is herein incorporated by reference.

BACKGROUND OF THE INVENTION

1. Field of the Invention

Exemplary embodiments relate to a liquid crystal display ("LCD") panel and a method of manufacturing the LCD panel. In particular, exemplary embodiments relate to an LCD panel including a liquid crystal composition and a method of manufacturing the LCD panel.

2. Description of the Related Art

Generally, an image is displayed on an LCD panel according to light transmittance of a liquid crystal layer, which is electrically controlled. An LCD panel having a patterned vertical alignment ("PVA") mode, which is a type of LCD panel having a vertical alignment ("VA") mode, has been developed to improve a viewing angle by aligning liquid crystal molecules in different directions by patterning a transparent electrode and forming liquid crystal domains. To solve the problem of low aperture ratio due to the patterning of the transparent electrode in a PVA mode LCD panel, an LCD panel may include a pixel electrode having a micro-slit pattern and a continuous common electrode formed on an opposite substrate.

The LCD panel having the micro-slit pattern improves the alignment reliability of the liquid crystal molecules by pretilting a portion of the liquid crystal molecules in a liquid crystal layer using a photoactive monomer, which has properties similar to liquid crystal molecules. The photoactive monomer is called a reactive mesogen.

The photoactive monomer that is not cured may remain within the liquid crystal layer during the manufacture of the LCD panel. When the photoactive monomer remains within the liquid crystal layer, the photoactive monomer may be cured by the backlight in a specific area during driving of the LCD panel, thereby inducing a non-uniform pretilt of the liquid crystal molecules. The non-uniform pretilt may display as an afterimage on the LCD panel and become one factor in a reduced display quality. To solve this problem, energy supplied during the curing of the photoactive monomer may be increased, or the exposure time may be lengthened to maximize the curing rate of the photoactive monomer.

However, the increasing of the illumination intensity of the light source to increase the energy for the curing may result in increased power consumption and increased manufacturing cost. In addition, the liquid crystal molecules and/or an alignment layer may be damaged, deteriorating the display quality. Further, when the exposure time is increased, the processing time for manufacturing the LCD panel increases, further reducing productivity.

BRIEF SUMMARY OF THE INVENTION

Exemplary embodiments provide a liquid crystal display ("LCD") panel having improved reliability.

Exemplary embodiments also provide a method of manufacturing the LCD panel capable of reducing the manufacturing time and improving productivity According to an exemplary embodiment, disclosed is a LCD panel including a first substrate, a second substrate and a liquid crystal layer. The first substrate includes a pixel electrode defining pixel areas, the pixel electrode electrically connected to a switching element disposed in each pixel area and including a micro-slit pattern, a first alignment layer disposed on the pixel electrode and a first reactive mesogen layer disposed on the first alignment layer. The second substrate includes a common electrode layer disposed on an entire portion of the second substrate facing the first substrate, a second alignment layer disposed on the common electrode layer and a second reactive mesogen layer disposed on the second alignment layer. The liquid crystal layer disposed between the first and second substrates includes a first liquid crystal compound represented by Chemical Formula 1, a second liquid crystal compound represented by Chemical Formula 2 and a third liquid crystal compound represented by Chemical Formula 3.

Chemical Formula 1

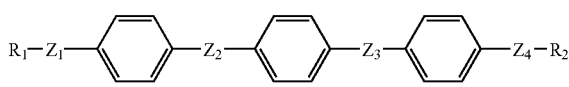

Chemical Formula 2

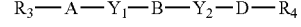

Chemical Formula 3

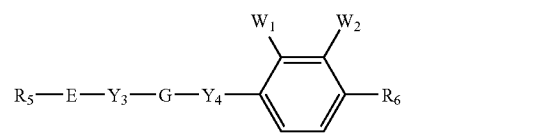

In Chemical Formula 1, each of $R_1$ and $R_2$ independently represents an alkyl group having 1 to 10 carbon atoms, fluorine (F) or chlorine (Cl), and each —$CH_2$— of $R_1$ and $R_2$ is independently substitutable with —O—, —CH=CH—, —CO—, —OCO— or —COO—, and each hydrogen atom of the three phenyl groups of Chemical Formula 1 is independently substitutable with —$OCF_3$, —$OCH_3$, fluorine or chlorine, each of $Z_1$, $Z_2$, $Z_3$ and $Z_4$ independently represents —$CH_2CH_2$—, —CH=CH—, —$CF_2O$—, —$OCF_2$—, —$CH_2O$—, —$OCH_2$—, —COO—, —OCO—,

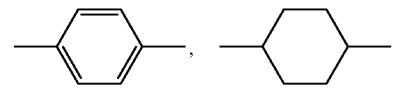

or a single bond. In Chemical Formulas 2 and 3, each of A and E independently represents a single bond or

and each of B, D and G independently represents a single bond,

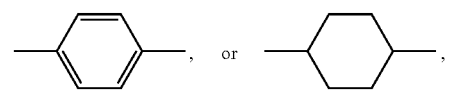

except when A, B and D simultaneously represent a single bond, and except when E and G simultaneously represent a single bond. Each of $R_3$, $R_4$, $R_5$ and $R_6$ independently represents an alkyl group having 1 to 12 carbon atoms and each —$CH_2$— included in $R_3$, $R_4$, $R_5$ and $R_6$ is independently substitutable with —O—, —CH=CH—, —CO—, —OCO— or —COO—, each of $Y_1$, $Y_2$, $Y_3$ and $Y_4$ independently represents —$CH_2CH_2$—, —CH=CH—, —$CF_2O$—, —$OCF_2$—, —$CH_2O$—, $OCH_2$—, —COO—, —OCO— or a single bond, and each of $W_1$ and $W_2$ independently represents fluorine, chlorine, —$OCF_3$ or —$OCH_3$.

Also disclosed is a method of manufacturing a liquid crystal display panel. The method includes disposing a first substrate including a pixel electrode defining pixel areas, the pixel electrode electrically connected to a switching element disposed in each pixel area and including a micro-slit pattern and a first alignment layer disposed on the pixel electrode; disposing a second substrate including a common electrode layer disposed on an entire surface of the second substrate and a second alignment layer disposed on the common electrode layer; and disposing a liquid crystal layer including a first liquid crystal compound represented by Chemical Formula 1, a second liquid crystal compound represented by Chemical Formula 2 and a third liquid crystal compound represented by Chemical Formula 3, the liquid crystal layer being disposed between the first and second substrates.

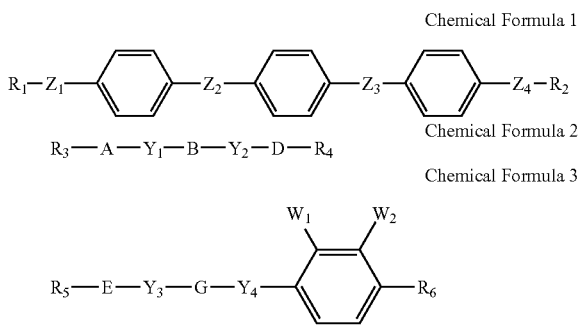

Chemical Formula 1

Chemical Formula 2

Chemical Formula 3 wherein, each of $R_1$ and $R_2$ independently represents an alkyl group having 1 to 10 carbon atoms, fluorine or chlorine, and each —$CH_2$— of $R_1$ and $R_2$ is independently substitutable with —O—, —CH=CH—, —CO—, —OCO— or —COO—, each hydrogen atom of the three phenyl groups of Chemical Formula 1 is independently substitutable with —$OCF_3$, —$OCH_3$, fluorine or chlorine, each of $Z_1$, $Z_2$, $Z_3$ and $Z_4$ independently represents —$CH_2CH_2$—, —CH=CH—, —$CF_2O$—, —$OCF_2$—, —$CH_2O$—, —$OCH_2$—, —COO—, —OCO—,

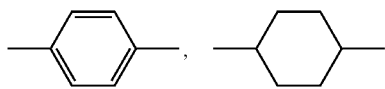

or a single bond, each of A and E independently represents a single bond or

and each of B, D and G independently represents a single bond,

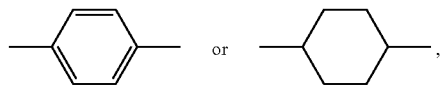

except when A, B and D simultaneously represent a single bond, and except when E and G simultaneously represent a single bond, each of $R_3$, $R_4$, $R_5$ and $R_6$ independently represents an alkyl group having 1 to 12 carbon atoms and each —$CH_2$— included in $R_3$, $R_4$, $R_5$ and $R_6$ is independently substitutable with —O—, —CH=CH—, —CO—, —OCO— or —COO—, each of $Y_1$, $Y_2$, $Y_3$ and $Y_4$ independently represents —$CH_2CH_2$—, —CH=CH—, —$CF_2O$—, —$OCF_2$—, —$CH_2O$—, $OCH_2$—, —COO—, —OCO— or a single bond, and each of $W_1$ and $W_2$ independently represents fluorine, chlorine, $OCF_3$ or $OCH_3$.

In an exemplary embodiment, the liquid crystal layer is formed by combining the first and second substrates and injecting liquid crystal molecules including the first, second and third liquid crystal compounds and a reactive mesogen between the substrates, and then polymerizing the reactive mesogen to form a first reactive mesogen layer and a second reactive mesogen layer on the first and second substrates, respectively.

According to an embodiment of the disclosed LCD panel and the method of manufacturing the same, a first liquid crystal compound has an advantageous structure for absorbing light energy and may stabilize a free radical of a reactive mesogen. Accordingly, the curing rate or the polymerization rate of the reactive mesogen may be improved without increasing light illuminance or an exposure time. The manufacturing time of the LCD panel may thus be decreased by decreasing of the exposure time, thereby improving the productivity of the LCD panel.

BRIEF DESCRIPTION OF THE DRAWINGS

The above and other features, aspects and advantages of this disclosure will become more apparent by describing in detailed example embodiments thereof with reference to the accompanying drawings, in which.

DETAILED DESCRIPTION OF THE INVENTION

Figure 1:
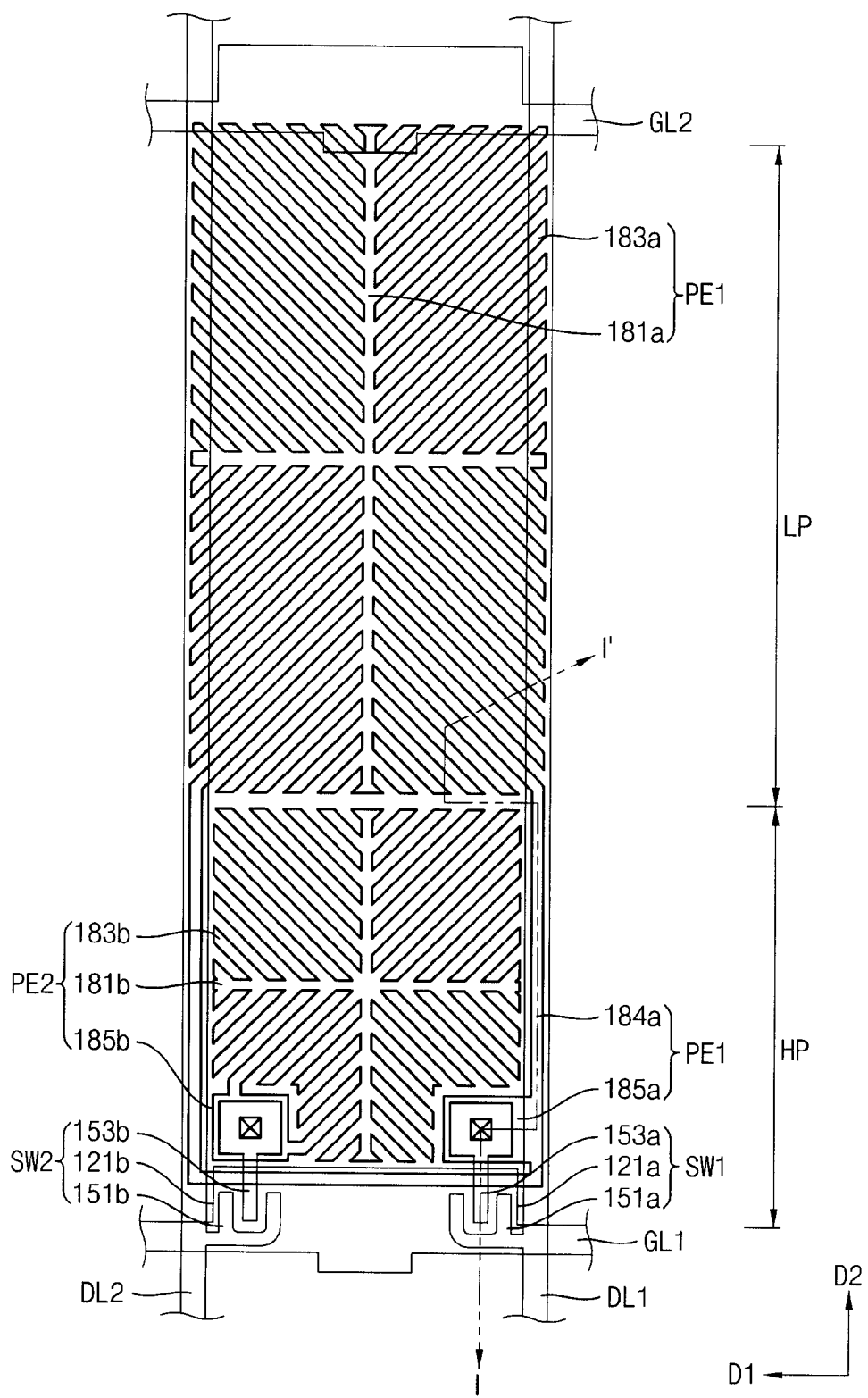
FIG. 1 is a plan view of an exemplary embodiment of a liquid crystal display ("LCD") panel.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a liquid crystal display ("LCD") panel and a method of manufacturing the same will be explained in further detail with reference to the accompanying drawings.

FIG. 1 is a plan view illustrating an exemplary embodiment of an LCD panel.

Figure 2:
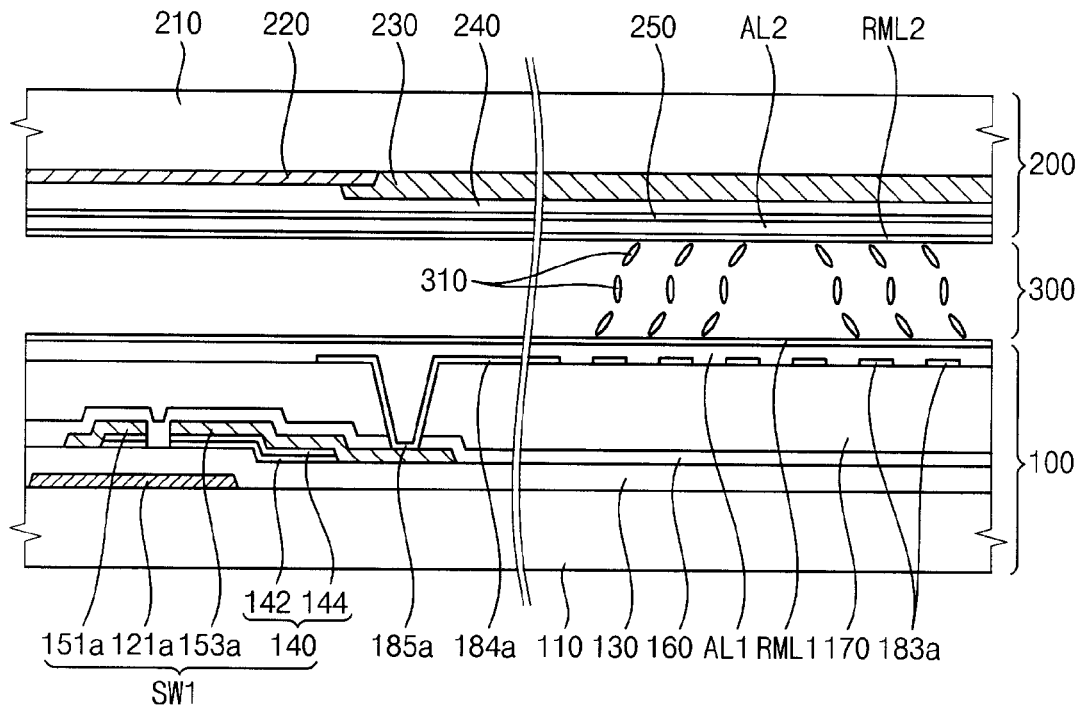
FIG. 2 is a cross-sectional view taken along line I-I' in FIG. 1.

FIG. 2 is a cross-sectional view taken along a line I-I' in FIG. 1.

Referring to FIGS. 1 and 2, a first LCD panel 500 according to an exemplary embodiment includes a first lower substrate 100, a first upper substrate 200 and a liquid crystal layer 300 disposed between the first lower and first upper substrates 100 and 200.

The liquid crystal layer 300 includes a plurality of liquid crystal molecules 310. The liquid crystal molecules 310 include a first liquid crystal compound represented by Chemical Formula 1, a second liquid crystal compound represented by Chemical Formula 2 and a third liquid crystal compound represented by Chemical Formula 3.

Chemical Formula 1

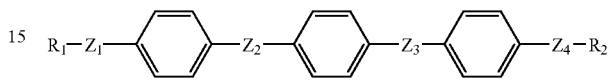

In Chemical Formula 1, each of $R_1$ and $R_2$ independently represents an alkyl group having 1 to 10 carbon atoms, fluorine (F) or chlorine (Cl), and each of $Z_1$, $Z_2$, $Z_3$ and $Z_4$ independently represents —$CH_2CH_2$—, —CH=CH—, —$CF_2O$—, —$OCF_2$—, —$CH_2O$—, —$OCH_2$—, —COO—, —OCO—,

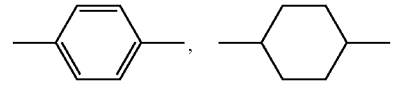

or a single bond. Each —$CH_2$— of $R_1$ and $R_2$ is independently substitutable with —O—, —CH=CH—, —CO—, —OCO— or —COO—, and each hydrogen atom of the three phenyl groups of Chemical Formula 1 is independently substitutable with —$OCF_3$, —$OCH_3$, fluorine or chlorine. The first liquid crystal compound, which is represented by Chemical Formula 1, may be a single compound or a mixture. In an embodiment, the first liquid crystal compound comprises at least one compound represented by Chemical Formula 1. In another embodiment, the first liquid crystal compound consists essentially of at least one compound represented by Chemical Formula 1. In another embodiment, the first liquid crystal compound consists of at least one compound represented by Chemical Formula 1.

In an embodiment, when each of the hydrogen atoms included in a phenyl group is independently substituted with other atoms or groups, the phenyl group may be represented by the following Chemical Formulas 11, 12, 13 and 14, independently.

Chemical Formula 11

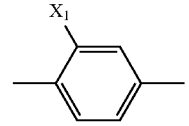

Chemical Formula 12

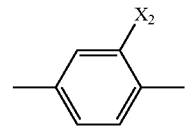

Chemical Formula 13

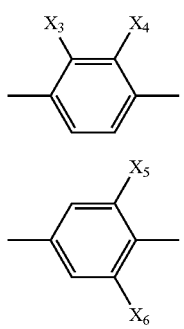

Chemical Formula 14

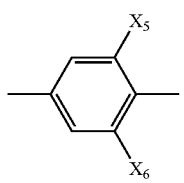

In Chemical Formulas 11 to 14, each of $X_1$, $X_2$, $X_3$, $X_4$, $X_5$ and $X_6$ independently represents —$OCF_3$, —$OCH_3$, fluorine or chlorine.

For example, the first liquid crystal compound may be represented by Chemical Formulas 15 or 16.

Chemical Formula 15

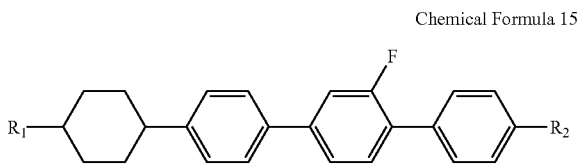

In Chemical Formula 15, each of $R_1$ and $R_2$ independently represents an alkyl group having 1 to 10 carbon atoms, fluorine or chlorine. Each —$CH_2$— of $R_1$ and $R_2$ is independently substitutable with —O—, —CH=CH—, —CO—, —OCO— or —COO—.

Chemical Formula 16

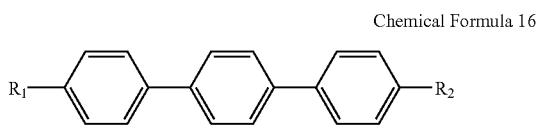

In Chemical Formula 16, each of $R_1$ and $R_2$ independently represents an alkyl group having 1 to 10 carbon atoms, fluorine or chlorine. Each —$CH_2$— of $R_1$ and $R_2$ is independently substitutable with —O—, —CH=CH—, —CO—, —OCO— or —COO—.

$R_3$-A-$Y_1$—B—$Y_2$-D-$R_4$      Chemical Formula 2

In Chemical Formula 2, A represents a single bond or

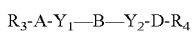

and each of B and D independently represents a single bond,

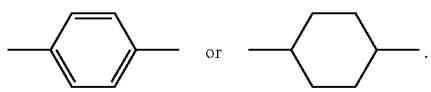

In an embodiment, the compounds wherein A, B and D are simultaneously single bonds are excluded. Each of $Y_1$ and $Y_2$ independently represents —$CH_2CH_2$—, —CH=CH—, —$CF_2O$—, —$OCF_2$—, —$CH_2O$—, —$OCH_2$—, —COO—, —OCO— or a single bond. Each —$CH_2$— of $R_3$ and $R_4$ is independently substitutable with —O—, —CH=CH—, —CO—, —OCO— or —COO—.

In an embodiment, the second liquid crystal compound may include compounds represented by the following Chemical Formulas 5, 6 and 7. These compounds may be used as a single compound or as a mixture. In an embodiment, the second liquid crystal compound comprises of at least one compound represented by Chemical Formulas 5, 6 and 7. In another embodiment, the second liquid crystal compound consists essentially of at least one compound represented by Chemical Formulas 5, 6 and 7. In another embodiment, the second liquid crystal compound consists of at least one compound represented by Chemical Formulas 5, 6 and 7.

Chemical Formula 5

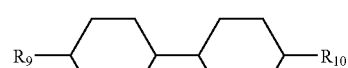

Chemical Formula 6

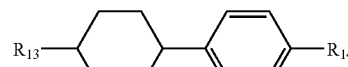

Chemical Formula 7

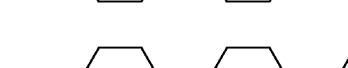

In Chemical Formulas 5 to 7, each of $R_9$, $R_{10}$, $R_{13}$, $R_{14}$, $R_{15}$ and $R_{16}$ independently represents an alkyl group having 1 to 12 carbon atoms. Each —$CH_2$— of the $R_9$, $R_{10}$, $R_{13}$, $R_{14}$, $R_{15}$ and $R_{16}$ is independently substitutable with —O—, —CH=CH—, —CO—, —OCO— or —COO—.

Chemical Formula 3

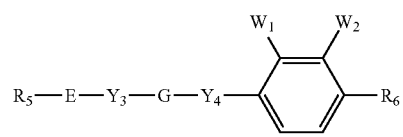

In Chemical Formula 3, E represents a single bond or

and G represents

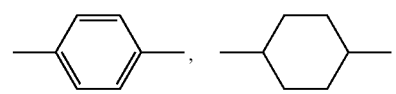

or a single bond. In an embodiment, the compounds wherein E and G are simultaneously single bonds are excluded. Each of $Y_3$ and $Y_4$ independently represents —$CH_2CH_2$—, —CH=CH—, —$CF_2O$—, —$OCF_2$—, —$CH_2O$—, —$OCH_2$—, —COO—, —OCO— or a single bond. In addition, each of $R_5$ and $R_6$ independently represents an alkyl group having 1 to 12 carbon atoms. Each of $W_1$ and $W_2$ independently represents fluorine, chlorine, —$OCF_3$ or —$OCH_3$. Each —$CH_2$— of $R_5$ and $R_6$ is independently substitutable with —O—, —CH=CH—, —CO—, —OCO— or —COO—.

The third liquid crystal compound may include compounds represented by Chemical Formulas 8, 9 and 10. These compounds may be used as a single compound or as a mixture. In an embodiment, the third liquid crystal compound comprises at least one compound represented by Chemical Formulas 8, 9 and 10. In another embodiment, the third liquid crystal compound consists essentially of at least one compound represented by Chemical Formulas 8, 9 and 10. In another embodiment, the third liquid crystal compound consists of at least one compound represented by Chemical Formulas 8, 9 and 10.

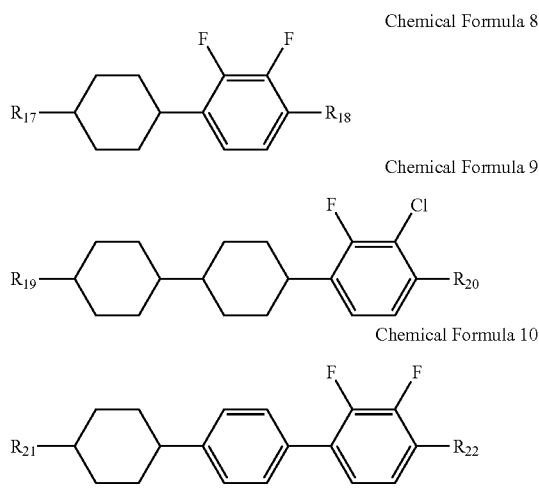

Chemical Formula 8

Chemical Formula 9

Chemical Formula 10

In Chemical Formulas 8, 9 and 10, each of $R_{17}$, $R_{18}$, $R_{19}$, $R_{20}$, $R_{21}$ and $R_{22}$ independently represents an alkyl group having 1 to 12 carbon atoms. Each —$CH_2$— of $R_{17}$ to $R_{22}$ is independently substitutable with —O—, —CH=CH—, —CO—, —OCO— or —COO—.

Figure 3:
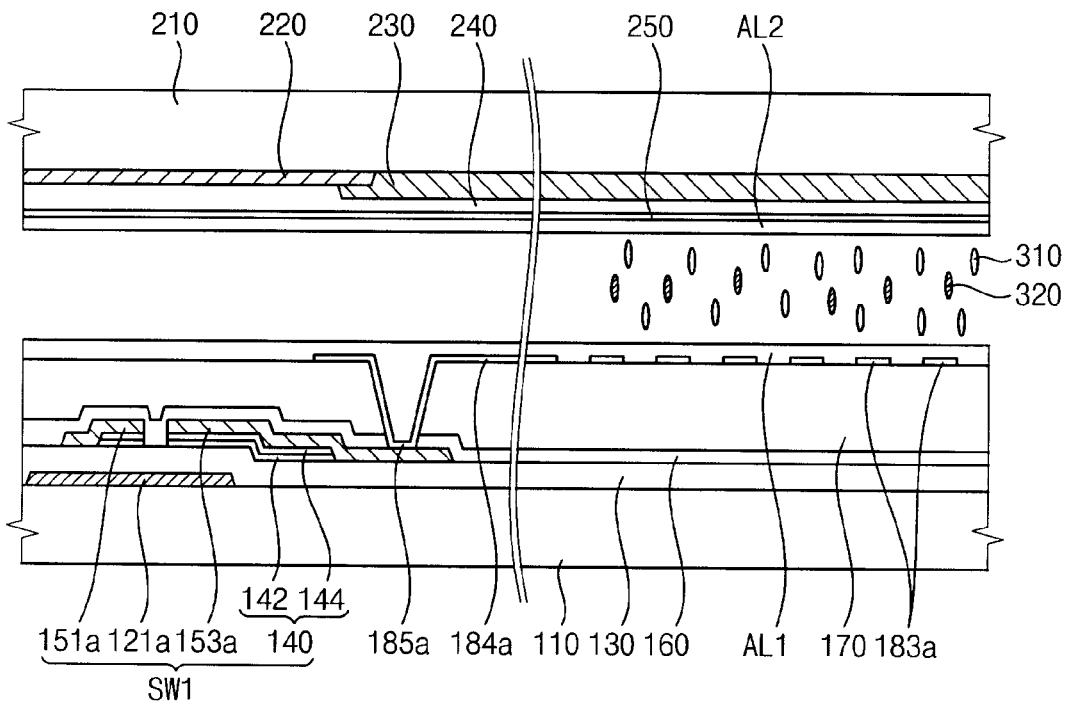
FIG. 3 is a cross-sectional view illustrating an exemplary embodiment of a method of manufacturing the LCD panel illustrated in FIG. 2.

The liquid crystal layer 300 may further include a reactive mesogen 320, as shown in FIG. 3. The reactive mesogen may not react during a forming of a first and a second mesogen layers RML1 and RML2, and may remain in the liquid crystal layer 300 and be included in the liquid crystal layer 300.

The first lower substrate 100 includes a first gate line GL1, a second gate line GL2, a first data line DL1, a second data line DL2, a switching element, a pixel electrode, a first alignment layer AL1 and the first reactive mesogen layer RML1, which are disposed on a first base substrate 110. The first and second gate lines GL1 and GL2 cross the first and second data lines DL1 and DL2 to define a pixel area. The switching element and the pixel electrode are disposed in the pixel area. The first lower substrate 100 may further include a gate insulation layer 130, a passivation layer 160 and an organic layer 170.

The first and second gate lines GL1 and GL2 extend in a first direction D1 of the first LCD panel 500 and may be aligned in a direction, which is substantially parallel with a second direction D2, which is different from the first direction D1. For example, the first direction D1 may be substantially perpendicular to the second direction D2. The first gate line GL1 is electrically connected to a first transistor SW1 and a second transistor SW2. The first and second data lines DL1 and DL2 extend in the second direction D2 and are aligned along the first direction D1. The first and second data lines DL1 and DL2 cross the first and second gate lines GL1 and GL2, respectively.

The switching element may include the first and second transistors SW1 and SW2. The first transistor SW1 is electrically connected to the first gate line GL1 and the second data line DL2. The first transistor SW1 includes a first gate electrode 121a electrically connected to the first gate line GL1, a first source electrode 151a electrically connected to the second data line DL2, a first drain electrode 153a spaced apart from the first source electrode 151a and a first active pattern 140. The first active pattern 140 may include a semiconductor layer 142 and an ohmic contact layer 144 subsequently formed on the gate insulation layer 130. The second transistor SW2 is electrically connected to the first gate line GL1 and the first data line DL1. The second transistor SW2 includes a second gate electrode 121b electrically connected to the first gate line GL1, a second source electrode 151b electrically connected to the first data line DL1, a second drain electrode 153b spaced apart from the second source electrode 151b and a second active pattern (not shown).

The pixel electrode may include a first sub-electrode PE1 and a second sub-electrode PE2. The first sub-electrode PE1 is electrically connected to the first transistor SW1. The first sub-electrode PE1 applies a first voltage through the second data line DL2. The second sub-electrode PE2 is electrically connected to the second transistor SW2. The second sub-electrode PE2 applies a second voltage through the first data line DL1. The second voltage may be higher than the first voltage. The region where the first sub-electrode PE1 is disposed is defined as a low pixel LP, and the region where the second sub-electrode PE2 is disposed is defined as a high pixel HP of the first LCD panel 500.

The first sub-electrode PE1 includes a plurality of first microelectrodes 183a, a first contact electrode 185a contacting the first drain electrode 153a and a bridge pattern 184a physically and electrically connecting the first microelectrodes 183a and the first contact electrode 185a. The bridge pattern 184a is disposed to surround the second sub-electrode PE2. The first microelectrodes 183a may have a radial shape and branch out from a first body part 181a having a cross shape extending in the first direction D1 and the second direction D2. The second sub-electrode PE2 includes a plurality of second microelectrodes 183b and a second contact electrode 185b contacting the second drain electrode 153b. The second microelectrodes 183b may have a radial shape and branch out from a second body part 181b having a cross shape.

The first alignment layer AL1 is disposed on the first base substrate 110 and the first and second sub-electrodes PE1 and PE2. The first alignment layer AL1 may be aligned so that the liquid crystal molecules 310 are aligned in a direction, which is substantially perpendicular to the surface of the first lower substrate 100. The first alignment layer AL1 may comprise, for example, a polyimide-based compound.

The first reactive mesogen layer RML1 may be disposed on the first alignment layer AL1. The first reactive mesogen layer RML1 may pretilt the liquid crystal molecules 310 at a selected angle with respect to a direction perpendicular to the surface of the first lower substrate 100. The first reactive mesogen layer RML1 may be disposed by curing the monomer, which is the reactive mesogen, using light. The reactive mesogen may be, for example, the compound represented by Chemical Formula 4.

$$R_7\text{-J-K-}R_8 \qquad \text{Chemical Formula 4}$$

In Chemical Formula 4, each of J and K independently represents

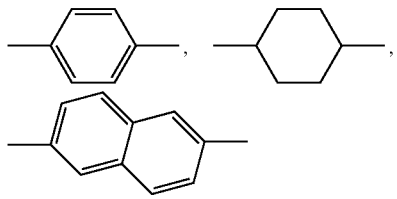

or a single bond. In an embodiment, compounds wherein both J and K are simultaneously a single bond are excluded. When present, each hydrogen atom in J and K is independently substitutable with fluorine, chlorine, an alkyl group having 1 to 12 carbon atoms or —OCH$_3$, and each of R$_7$ and R$_8$ independently represents

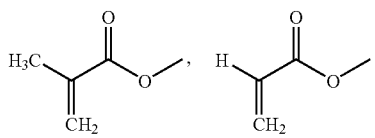

or a hydrogen atom. Only the compounds wherein R$_7$ and R$_8$ represent simultaneously a hydrogen atom are excluded.

The first upper substrate 200 includes a black matrix pattern 220, a color filter 230, an overcoating layer 240, a common electrode layer 250, a second alignment layer AL2 and a second reactive mesogen layer RML2, which are disposed on a second base substrate 210 facing the first lower substrate 100. The common electrode layer 250 faces the first and second sub-electrodes PE1 and PE2 and is disposed on the entire surface of the second base substrate 210. The direction of an electric field applied to the liquid crystal layer 300 may be controlled by disposing the common electrode layer 250 on the overcoating layer 240 without an additional patterning process due to the first and second sub-electrodes PE1 and PE2 of the first lower substrate 100.

The second alignment layer AL2 is disposed on the common electrode layer 250 and the second reactive mesogen layer RML2 may be disposed on the second alignment layer AL2. The second alignment layer AL2 and the second reactive mesogen layer RML2 are substantially the same as the first alignment layer AL1 and the first reactive mesogen layer RML1 except that the second alignment layer AL2 and the second reactive mesogen layer RML2 are disposed on the first upper substrate 200. Therefore, repeated explanation will be omitted.

The first, second and third liquid crystal compounds are aligned along the perpendicular direction by the first and second alignment layers AL1 and AL2 and are pretilted at a selected angle with respect to the perpendicular direction by the first and second mesogen layers RML1 and RML2.

FIG. 3 is a cross-sectional view illustrating an exemplary embodiment of a manufacturing method of the LCD panel in FIG. 2.

Referring to FIG. 3, a gate pattern is disposed on the first base substrate 110. The gate pattern includes the first and second gate lines GL1 and GL2 and the first and second gate electrodes 121a and 121b. The gate insulation layer 130 is disposed on the first base substrate 110 including the gate pattern formed thereon. The first active pattern 140 and the second active pattern are disposed on the gate insulation layer 130.

A source pattern is disposed on the first base substrate 110 and the first active pattern 140 and the second active pattern disposed thereon. The source pattern includes the first and second data lines DL1 and DL2, the first and second source electrodes 151a and 151b and the first and second drain electrodes 153a and 153b. The passivation layer 160 and the organic layer 170 are subsequently disposed on the first base substrate 110 and the source pattern disposed thereon.

The first and second sub-electrodes PE1 and PE2 are disposed on the first base substrate 110 and the passivation layer 160 and the organic layer 170. The first and second sub-electrodes PE1 and PE1 are disposed in the pixel area.

The first alignment layer AL1 is disposed on the first base substrate 110 and the first and second sub-electrodes PE1 and PE2 disposed thereon. The first alignment layer AL1 may be disposed on the entire surface of the first base substrate 110.

Meanwhile, the black matrix pattern 220 is disposed on the second base substrate 210. The black matrix pattern 220 may be disposed in the area of the second base substrate 210 corresponding to the gate pattern and/or the source pattern.

The color filter 230 is disposed on the second base substrate 210 including the black matrix pattern 220 disposed thereon. The color filter 230 may be disposed in the area of the second base substrate 210 corresponding to the pixel area.

The overcoating layer 240 is disposed on the second base substrate 210 and the black matrix pattern 220 and the color filter 230, and the common electrode layer 250 is disposed on the second base substrate 210 and the overcoating layer 240 disposed thereon. The common electrode layer 250 may be disposed on the entire surface of the second base substrate 210 without an additional patterning process.

In an embodiment, the second alignment layer AL2 is disposed on the second base substrate 210 and the common electrode layer 250. The second alignment layer AL2 may be disposed on the entire surface of the second base substrate 210.

The first lower substrate 100, the first alignment layer AL1, the first upper substrate 200 and the second alignment layer AL2 are combined so that the first and the second alignment layers AL1 and AL2 face each other. A liquid crystal composition is injected between the first lower and first upper substrates 100 and 200. For example, the liquid crystal composition may be injected between the first lower and first upper substrates 100 and 200 after combining the first lower and first upper substrates 100 and 200. Alternatively, the liquid crystal composition may be disposed onto the first lower substrate 100, and then the first lower and first upper substrates 100 and 200 are combined to interpose the liquid crystal composition between the first lower and first upper substrates 100 and 200.

The liquid crystal composition includes a first liquid crystal compound represented by Chemical Formula 1, a second liquid crystal compound represented by Chemical Formula 2, a third liquid crystal compound represented by Chemical Formula 3 and a reactive mesogen polymerizable by light.

Chemical Formula 1

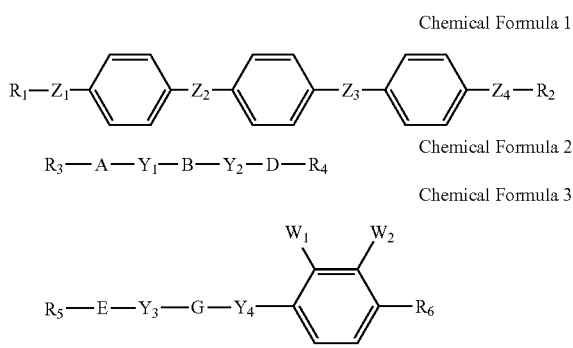

Chemical Formula 2

R$_3$—A—Y$_1$—B—Y$_2$—D—R$_4$

Chemical Formula 3

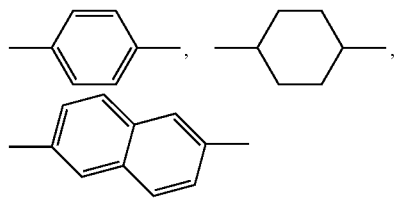

In Chemical Formula 1, each of R$_1$ and R$_2$ independently represents an alkyl group having 1 to 10 carbon atoms, fluorine or chlorine, each —CH$_2$—R$_1$ and R$_2$ is independently substitutable with —O—, —CH=CH—, —CO—, —OCO— or —COO—, and each hydrogen atom of the three phenyl groups of Chemical Formula 1 is independently substitutable with —OCF$_3$, —OCH$_3$, fluorine or chlorine, and each of Z$_1$, Z$_2$, Z$_3$ and Z$_4$ independently represents —CH$_2$CH$_2$—, —CH=CH—, —CF$_2$O—, —OCF$_2$—, —CH$_2$O—, —OCH$_2$—, —COO—, —OCO—,

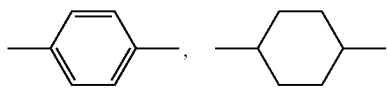

or a single bond. In Chemical Formulas 2 and 3, each of A and E independently represents a single bond or

and each of B, D and G independently represents a single bond,

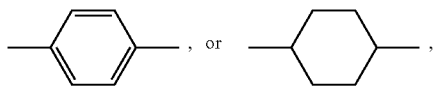

except when A, B and D simultaneously represent a single bond, and except when E and G simultaneously represent a single bond. Each of R$_3$, R$_4$, R$_5$ and R$_6$ independently represents an alkyl group having 1 to 12 carbon atoms and each —CH$_2$— included in R$_3$, R$_4$, R$_5$ and R$_6$ is independently substitutable with —O—, —CH=CH—, —CO—, —OCO— or —COO—. Each of Y$_1$, Y$_2$, Y$_3$ and Y$_4$ independently represents —CH$_2$CH$_2$—, —CH=CH—, —CF$_2$O—, —OCF$_2$—, —CH$_2$O—, —OCH$_2$—, —COO—, —OCO— or a single bond, and each of W$_1$ and W$_2$ independently represents fluorine, chlorine, —OCF$_3$ or —OCH$_3$.

The reactive mesogen may be the compound represented by Chemical Formula 4.

R$_7$-J-K—R$_8$    Chemical Formula 4

In Chemical Formula 4, each of J and K independently represents

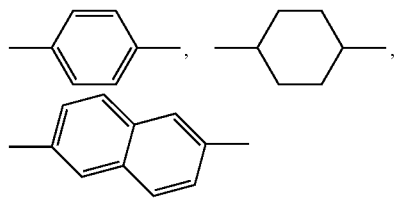

or a single bond and J and K may not simultaneously represent a single bond. When present, each hydrogen atom included in J and K is independently substitutable with an alkyl group having 1 to 12 carbon atoms or —OCH$_3$, and each of R$_7$ and R$_8$ independently represents

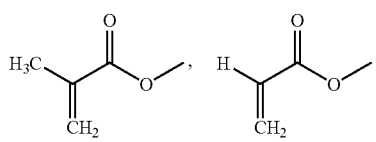

or a hydrogen atom. Only the compounds wherein R$_7$ and R$_8$ represent simultaneously a hydrogen atom are excluded.

When, the liquid crystal composition is disposed between the first lower and first upper substrates 100 and 200 in a manner wherein a voltage is not applied to the first lower and first upper substrates 100 and 200, the first, second and third liquid crystal compounds and the reactive mesogen are aligned in a direction substantially perpendicular to the surface of the first lower substrate 100.

The rotational viscosity of the liquid crystal composition may be about 60 mPa·s to about 200 mPa·s, specifically about 100 mPa·s to about 160 mPa·s, more specifically about 110 mPa·s to about 150 mPa·s.

The dielectric anisotropy ("Δ∈") of the liquid crystal composition may be about −2.0 to about −5.0, specifically about −3.0 to about −4.0, more specifically about −3.5.

The refractive anisotropy ("Δn") of the liquid crystal composition may be about 0.08 to about 0.12, specifically about 0.08 to about 0.11, more specifically about 0.10.

In an embodiment of the liquid crystal composition, when the amount of the liquid crystal compound is less than about 0.1 percent ("%") by weight, the first liquid crystal compound has little stabilizing effect on the reactive mesogen, and the curing rate of the reactive mesogen may not increase. When the amount of the first liquid crystal compound exceeds about 20% by weight, the natural properties of the liquid crystal composition, that is, a mesostate between the solid state and the liquid state, may easily change into a solid state. Therefore, a desired amount of the liquid crystal is about 0.1% by weight to about 20% by weight, specifically about 1% by weight to about 15% by weight, more specifically about 5% by weight to about 10% by weight, based on the total weight of the liquid crystal composition. The amount of the second liquid crystal compound and the third liquid crystal compound may be controlled to be within a range according to the physical properties of the liquid crystal compounds. The rotational viscosity, the dielectric anisotropy and the refractive anisotropy of the liquid crystal composition may depend on the amount of the second and third liquid crystal compounds. The liquid crystal composition according to the exemplary embodiments may include about 30% by weight to about 70% by weight, specifically about 40% by weight to about 60% by weight, more specifically about 50% by weight of the second liquid crystal compound and about 10% by weight to about 60% by weight, specifically about 20% by weight to about 50% by weight, more specifically about 30% by weight to about 40% by weight of the third liquid crystal compound, based on the total weight of the liquid crystal composition. When the amount of the reactive mesogen is less than about 0.05% by weight, the reactive mesogen layer may not be formed adjacent to the alignment layer of the LCD panel due to ultraviolet ("UV") light. When the amount of the reactive mesogen exceeds about 1% by weight, the physical properties of the liquid crystal composition may be changed. Therefore, a desired amount of the reactive mesogen is about 0.05% by weight to about 1% by weight.

For example, a liquid crystal composition according to an exemplary embodiment may have a rotational viscosity of about 135 mPa·s, a dielectric anisotropy of about −3.3 and a refractive anisotropy of about 0.09. The liquid crystal composition may include a first liquid crystal compound represented by Chemical Formula 17 and a reactive mesogen represented by Chemical Formula 18. The amount of the compound represented by Chemical Formula 17 may be about 0.1% by weight to about 5% by weight, specifically about 0.5% by weight to about 3% by weight, more specifically about 1% by weight, based on the total weight of the liquid crystal composition, and the amount of the compound represented by Chemical Formula 18 may be about 0.1% by weight to about 5% by weight, specifically about 0.5% by weight to about 3% by weight, more specifically about 0.204% by weight, based on the total weight of the liquid crystal composition.

Chemical Formula 17

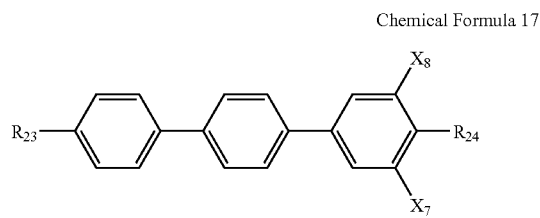

In Chemical Formula 17, $R_{23}$ and $R_{24}$ independently represent an alkyl group having 1 to 10 carbon atoms, fluorine or chlorine. Each $-CH_2-$ of $R_{23}$ and $R_{24}$ is independently substitutable with $-O-$, $-CH=CH-$, $-CO-$, $-OCO-$ or $-COO-$. $X_7$ and $X_8$ independently represent $-OCF_3$, $-OCH_3$, fluorine or chlorine.

Chemical Formula 18

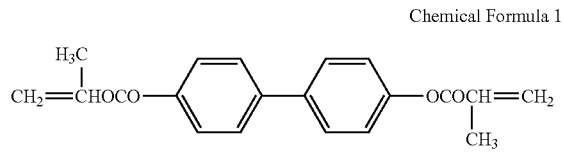

Figure 4:
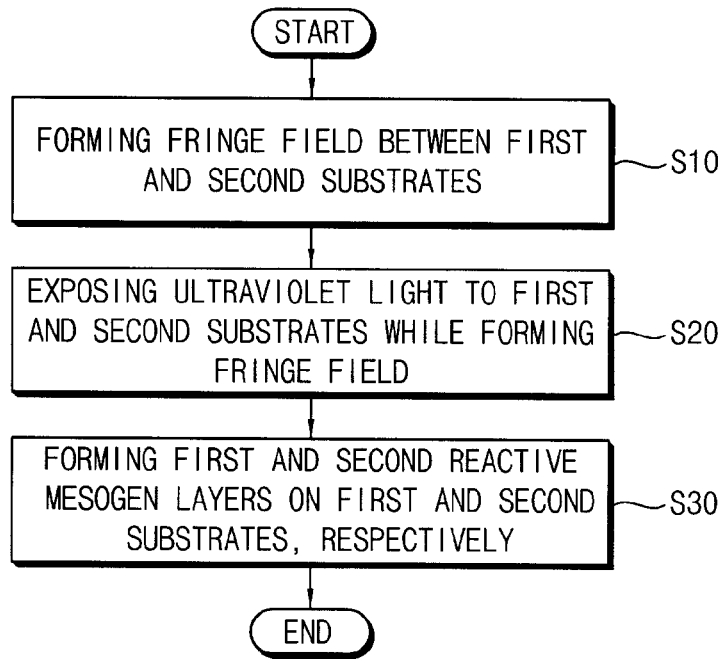
FIG. 4 is a flowchart illustrating an exemplary embodiment of a manufacturing process of first and second reactive mesogen layers in FIG. 2.

FIG. 4 is a flowchart illustrating an exemplary embodiment of a manufacturing process of first and second reactive mesogen layers in FIG. 2.

Referring to FIGS. 3 and 4, a fringe field is formed by applying a voltage between the first lower and first upper substrates 100 and 200, to form a tilt of the first, second and third liquid crystal compounds and the reactive mesogen, as indicated by first operation S10.

In second operation S20, the first lower and first upper substrates 100 and 200 are exposed to light while the voltage is applied thereto. The light may be UV light. The reactive mesogen is polymerized by the light and cured. The first, second and third liquid crystal compounds maintain the tilted state during exposure to the light because the fringe field is formed between the first lower and first upper substrates 100 and 200.

In third operation S30, a first reactive mesogen layer RML1 is disposed on the first lower substrate 100 and a second reactive mesogen layer RML2 is disposed on the first upper substrate 200. The first reactive mesogen layer RML1 is disposed on the first alignment layer AL1, and the second reactive mesogen layer RML2 is disposed on the second alignment layer AL2. The first and second reactive mesogen layers RML1 and RML1 may pretilt the first, second and third liquid crystal compounds adjacent thereto. Therefore, the first, second and third liquid crystal compounds may maintain the tilted state with a selected angle by the first and second mesogen layers RML1 and RML2, after the fringe field between the first lower and first upper substrates 100 and 200 is eliminated.

The first liquid crystal compound enables a stable polymerization of the reactive mesogen during a disposing of the first and second reactive mesogen layers RML1 and RML2. For example, when a free radical is generated by the light in each reactive mesogen, the first liquid crystal compound may stabilize the free radical of the reactive mesogen until the free radical of one of the reactive mesogens reacts with another free radical of the adjacent reactive mesogen. Furthermore, the first liquid crystal compound includes at least three phenyl groups to facilitate the absorption of the light and the transmission of energy to the reactive mesogen.

In an embodiment wherein about 3% or less of the reactive mesogen remains, based on the initially used amount of the reactive mesogen of the liquid crystal composition, the energy required for curing the liquid crystal composition including the first liquid crystal compound may be lower than that used for curing a commercially available liquid crystal composition not including the first liquid crystal compound. Thus, when the same energy is applied for the liquid crystal composition including the first liquid crystal compound and the commercially available liquid crystal composition, the curing rate of the reactive mesogen in the liquid crystal composition including the first liquid crystal compound is faster than that of the commercially available liquid crystal composition.

Accordingly, polymerization of the reactive mesogen may be promoted, and the curing rate of the reactive mesogen may be increased without increasing the illumination intensity of the light source or the exposure time. Thus, the time required for disposing the first and second mesogen layers RML1 and RML2 may be reduced.

Figure 5:
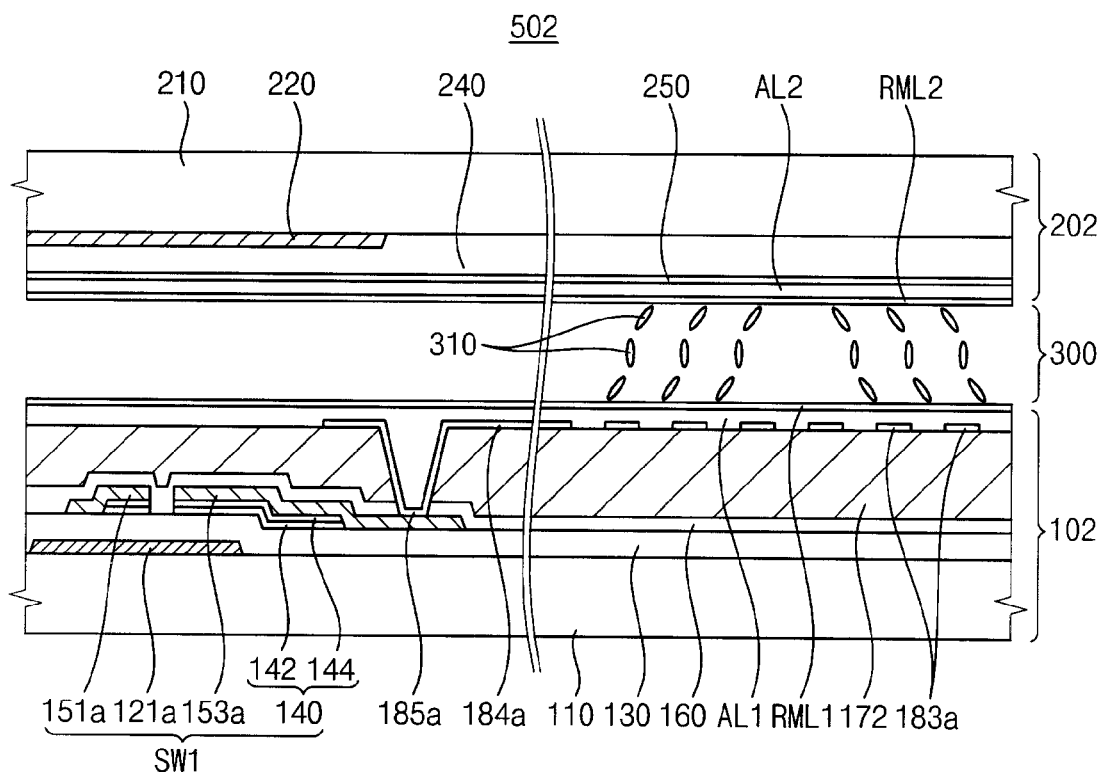
FIG. 5 is a cross-sectional view illustrating another exemplary embodiment of an LCD panel.

FIG. 5 is a cross-sectional view illustrating another exemplary embodiment of an LCD panel.

The plan view of the LCD panel in FIG. 5 is substantially the same as the plan view of FIG. 1. Therefore, the LCD panel according to this exemplary embodiment will be described with reference to FIGS. 1 and 5.

Referring to FIG. 5, an second LCD panel 502 according to another exemplary embodiment includes a second lower substrate 102, a second upper substrate 202 and a liquid crystal layer 300 disposed between the second lower and second upper substrates 102 and 202.

The liquid crystal layer 300 includes a plurality of liquid crystal molecules 310. The liquid crystal molecules 310 are substantially the same as those described with reference to FIG. 2. Therefore, repeated explanation will be omitted.

Referring to FIGS. 1 and 5, a second lower substrate 102 includes a first gate line GL1, a second gate line GL2, a first data line DL1, a second data line DL2, a switching element including first and second transistors SW1 and SW2, a color filter 172, a pixel electrode including first and second sub-electrodes PE1 and PE2, a first alignment layer AL1 and a first reactive mesogen layer RML1, disposed on a first base substrate 110. The second lower substrate 102 is substantially the same as the first substrate illustrated in FIG. 1 except for the color filter 172. Therefore, repeated explanation will be omitted.

The color filter 172 may be disposed on a passivation layer 160 to cover the first and second transistors SW1 and SW2. The color filter 172 may be disposed in a pixel area defined by the first and second gate lines GL1 and GL2 and the first and second data lines DL1 and DL2.

The second upper substrate 202 includes a black matrix pattern 220, an overcoating layer 240, a common electrode layer 250, a second alignment layer AL2 and a second reactive mesogen layer RML2, disposed on a second base substrate 210. The second upper substrate 202 is substantially the same as the second substrate illustrated in FIG. 2 except that the color filter 230 illustrated in FIG. 2 is disposed on the second lower substrate 102. Therefore, a repeated explanation will be omitted.

An embodiment of a manufacturing method of the second LCD panel 502 in FIG. 5 will be further described in brief. The first transistor SW1 and the passivation layer 160 are disposed on the first base substrate 110, and the color filter 172 is formed on the passivation layer 160. The first sub-electrode PE1 is disposed on the first base substrate 110 including the color filter 172 formed thereon, and the first alignment layer AL1 is disposed on the first base substrate 110 including the first sub-electrode PE1 formed thereon.

The black matrix pattern 220, the overcoating layer 240, the common electrode layer 250 and the second alignment layer AL2 are subsequently disposed on the second base substrate 210.

Then, the first lower substrate 100, including the first alignment layer AL1 and the first upper substrate 200, including the second alignment layer AL2, are combined so that the first and second alignment layers AL1 and AL2 face each other. Between the second lower and second upper substrates 102 and 202, the liquid crystal composition is disposed. The liquid crystal composition is substantially the same as that described with reference to FIG. 3, and further explanation of the material will therefore be omitted.

The first and second mesogen layers RML1 and RML2 are formed by exposing light while forming a fringe field between the second lower and second upper substrates 102 and 202. The forming of the first and second reactive mesogen layers RML1 and RML2 is substantially the same as that described with reference to FIG. 4, thus further description thereof will be omitted.

Accordingly, as described with reference to the second LCD panel 502 and the method of manufacturing the LCD panel, the liquid crystal molecules 310 may be pretilted by the first and second reactive mesogen layers RML1 and RML2. In an embodiment, the first liquid crystal compound among the liquid crystal molecules 310 promotes the curing of the reactive mesogen during the forming of the first and second reactive mesogen layers RML1 and RML2. In addition, the operation of forming a planarization layer on the passivation layer 160 may be omitted by disposing the color filter 172 on the first base substrate 110 to reduce the number of manufacturing processes associated with the manufacture of the second LCD panel 502. Accordingly, the productivity and manufacturing reliability of the second LCD panel 502 may be improved.

The black matrix pattern 220 on the second upper substrate 202 illustrated in FIG. 5 may be disposed on the second lower substrate 102. Accordingly, the black matrix pattern 220 may be disposed on the first base substrate 110, corresponding to the first and second gate lines GL1 and GL2, the first and second data lines DL1 and DL2 and the first and second transistors SW1 and SW2 of the second lower substrate 102. On the second base substrate 210, the common electrode layer 250, the second alignment layer AL2 and the second reactive mesogen layer RML2 may be disposed.

Accordingly, the curing rate (or polymerization rate) of a reactive mesogen of an exemplary embodiment of an LCD panel or an exemplary embodiment of a method of manufacturing the LCD panel may be improved without increasing the illuminance of a light source or exposure time for all types of LCD panels, which use a reactive mesogen to impart a pretilt angle to liquid crystal molecules. Accordingly, the productivity of the LCD panel may be improved.

The foregoing is illustrative of the disclosed embodiments and is not to be construed as limiting thereof. Although a few exemplary embodiments have been described, those skilled in the art will readily appreciate that many modifications are possible in the exemplary embodiments without materially departing from the novel teachings and advantages of this disclosure. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A liquid crystal display panel comprising:
   a first substrate including a pixel electrode defining pixel areas, the pixel electrode electrically connected to a switching element disposed in each pixel area and including a micro-slit pattern, a first alignment layer disposed on the pixel electrode and a first reactive mesogen layer disposed on the first alignment layer;
   a second substrate including a common electrode layer disposed on an entire portion of the second substrate facing the first substrate, a second alignment layer disposed on the common electrode layer and a second reactive mesogen layer disposed on the second alignment layer; and
   a liquid crystal layer disposed between the first and second substrates and including a first liquid crystal compound represented by Chemical Formula 1, a second liquid crystal compound represented by Chemical Formula 2 and a third liquid crystal compound represented by Chemical Formula 3, Chemical Formula 1

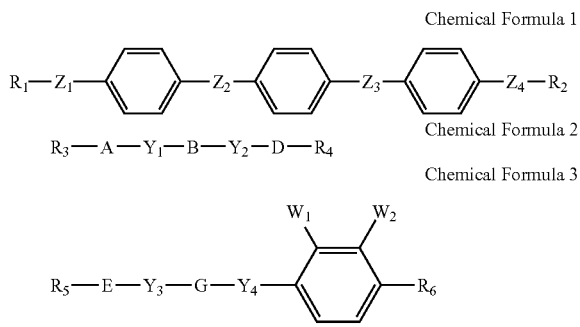

Chemical Formula 2

Chemical Formula 3 wherein each of $R_1$ and $R_2$ independently represents an alkyl group having 1 to 10 carbon atoms, fluorine or chlorine, and each —$CH_2$— of $R_1$ and $R_2$ is independently substitutable with —O—, —CH=CH—, —CO—, —OCO— or —COO—, each hydrogen atom of the phenyl groups of Chemical Formula 1 is independently substitutable with —$OCF_3$, —$OCH_3$, fluorine or chlorine, each of $Z_1$, $Z_2$, $Z_3$ and $Z_4$ independently represents —$CH_2CH_2$—, —CH=CH—, —$CF_2$O—, —$OCF_2$—, —$CH_2$O—, —$OCH_2$—, —COO—, —OCO—,

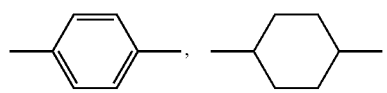

or a single bond, each of A and E independently represents a single bond or

and each of B, D and G independently represents a single bond,

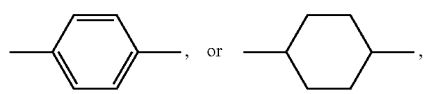

except when A, B and D simultaneously represent a single bond, and except when E and G simultaneously represent a single bond, each of $R_3$, $R_4$, $R_5$ and $R_6$ independently represents an alkyl group having 1 to 12 carbon atoms and each —$CH_2$— included in $R_3$, $R_4$, $R_5$ and $R_6$ is independently substitutable with —O—, —CH=CH—, —CO—, —OCO— or —COO—, each of $Y_1$, $Y_2$, $Y_3$ and $Y_4$ independently represents —$CH_2CH_2$—, —CH=CH—, —$CF_2$O—, —$OCF_2$—, —$CH_2$O—, $OCH_2$—, —COO—, —OCO— or a single bond, and each of $W_1$ and $W_2$ independently represents fluorine, chlorine, —$OCF_3$ or —$OCH_3$.

2. The LCD panel of claim 1, wherein the first and second mesogen layers are formed by polymerizing a photopolymerizable reactive mesogen.

3. The LCD panel of claim 1, wherein the liquid crystal layer further comprises a reactive mesogen represented by Chemical Formula 4, $R_7$-J-K-$R_8$     Chemical Formula 4 wherein each of J and K independently represents

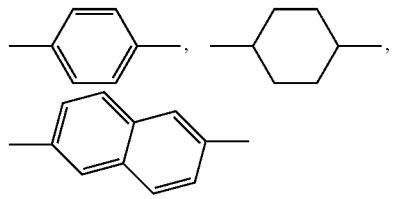

or a single bond, J and K may not simultaneously represent a single bond and when present each hydrogen atom included in J and K is independently substitutable with fluorine, chlorine, an alkyl group having 1 to 12 carbon atoms or —$OCH_3$, and each of $R_7$ and $R_8$ independently represents

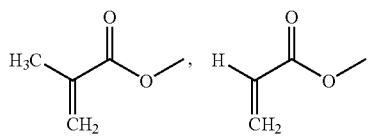

or a hydrogen atom, except when $R_7$ and $R_8$ simultaneously represent a hydrogen atom.

4. The LCD panel of claim 1, wherein the second liquid crystal compound includes at least one compound selected from the group consisting of compounds represented by Chemical Formula 5, Chemical Formula 6 and Chemical Formula 7,

Chemical Formula 5

Chemical Formula 6

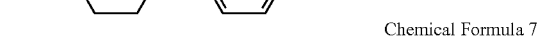

Chemical Formula 7 wherein each of $R_9$, $R_{10}$, $R_{13}$, $R_{14}$, $R_{15}$ and $R_{16}$ independently represents an alkyl group having 1 to 12 carbon atoms, and each —$CH_2$— of $R_9$, $R_{10}$, $R_{13}$, $R_{14}$, $R_{15}$ and $R_{16}$ is independently substitutable with —O—, —CH=CH—, —CO—, —OCO— or —COO—.

5. The LCD panel of claim 1, wherein the third liquid crystal compound includes at least one compound selected from the group consisting of compounds represented by Chemical Formula 8, Chemical Formula 9 and Chemical Formula 10, Chemical Formula 8

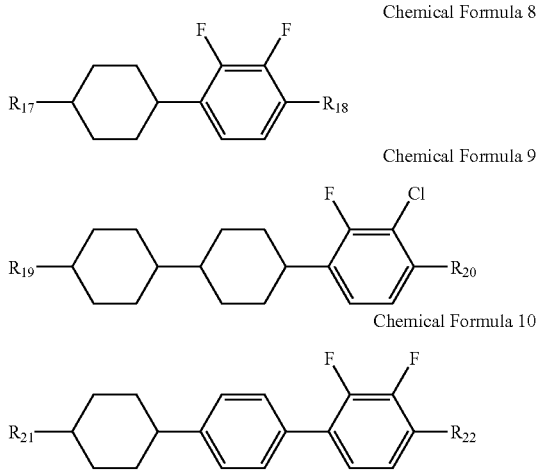

Chemical Formula 9

Chemical Formula 10 wherein each of $R_{17}$, $R_{18}$, $R_{19}$, $R_{20}$, $R_{21}$ and $R_{22}$ independently represents an alkyl group having 1 to 12 carbon atoms, and each of —$CH_2$— of $R_{17}$ to $R_{22}$ is independently substitutable with —O—, —CH=CH—, —CO—, —OCO— or —COO—.

6. The LCD panel of claim 1, wherein the first substrate further comprises a color filter disposed in the pixel area.

7. The LCD panel of claim 1, wherein the first substrate further comprises a black matrix pattern disposed at a boundary between neighboring pixel areas.

8. The LCD panel of claim 1, wherein the first and second mesogen layers pretilt the first, second and third liquid crystal compounds.

9. A method of manufacturing a liquid crystal display panel, the method comprising:
disposing a first substrate including a pixel electrode defining pixel areas, the pixel electrode electrically connected to a switching element disposed in each pixel area and including a micro-slit pattern and a first alignment layer disposed on the pixel electrode;
disposing a second substrate including a common electrode layer disposed on an entire surface of the second substrate and a second alignment layer disposed on the common electrode layer; and
disposing a liquid crystal layer including a first liquid crystal compound represented by Chemical Formula 1, a second liquid crystal compound represented by Chemical Formula 2 and a third liquid crystal compound represented by Chemical Formula 3, the liquid crystal layer being disposed between the first and second substrates, Chemical Formula 1

Chemical Formula 2

Chemical Formula 3

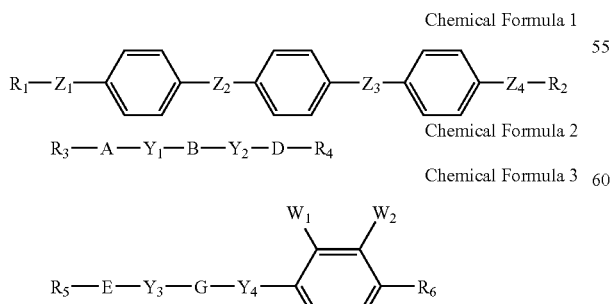

wherein, each of $R_1$ and $R_2$ independently represents an alkyl group having 1 to 10 carbon atoms, fluorine or chlorine, and each —$CH_2$— of $R_1$ and $R_2$ is independently substitutable with —O—, —CH=CH—, —CO—, —OCO— or —COO—, each hydrogen atom of the three phenyl groups of Chemical Formula 1 is independently substitutable with —$OCF_3$, —$OCH_3$, fluorine or chlorine, each of $Z_1$, $Z_2$, $Z_3$ and $Z_4$ independently represents —$CH_2CH_2$—, —CH=CH—, —$CF_2O$—, —$OCF_2$—, —$CH_2O$—, —$OCH_2$—, —COO—, —OCO—,

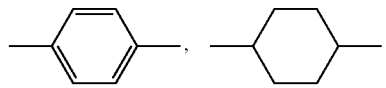

or a single bond, each of A and E independently represents a single bond or

and each of B, D and G independently represents a single bond,

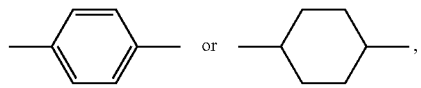

except when A, B and D simultaneously represent a single bond, and except when E and G simultaneously represent a single bond, each of $R_3$, $R_4$, $R_5$ and $R_6$ independently represents an alkyl group having 1 to 12 carbon atoms and each —$CH_2$— included in $R_3$, $R_4$, $R_5$ and $R_6$ is independently substitutable with —O—, —CH=CH—, —CO—, —OCO— or —COO—, each of $Y_1$, $Y_2$, $Y_3$ and $Y_4$ independently represents —$CH_2CH_2$—, —CH=CH—, —$CF_2O$—, —$OCF_2$—, —$CH_2O$—, $OCH_2$—, —COO—, —OCO— or a single bond, and each of $W_1$ and $W_2$ independently represents fluorine, chlorine, $OCF_3$ or $OCH_3$.

10. The method of claim 9, wherein disposing the liquid crystal layer comprises:
combining the first and second substrates and injecting liquid crystal molecules including the first, second and third liquid crystal compounds and a reactive mesogen; and
polymerizing the reactive mesogen to form a first reactive mesogen layer and a second reactive mesogen layer on the first and second substrates, respectively.

11. The method of claim 10, wherein forming the first reactive mesogen layer and the second reactive mesogen layer further comprises:
applying a voltage between the first and second substrates, which include the liquid crystal composition disposed between the first and second substrates; and
providing light while applying the voltage.

12. The method of claim 10, wherein the reactive mesogen is a compound represented by the following Chemical Formula 4,

   Chemical Formula 4 wherein each of J and K independently represents

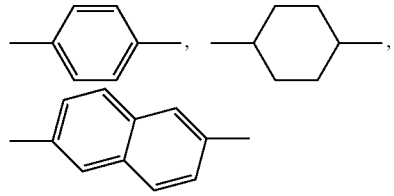

or a single bond, J and K may not simultaneously represent a single bond and when present each hydrogen atom included in J and K is independently substitutable with fluorine, chlorine, an alkyl group having 1 to 12 carbon atoms or —$OCH_3$, and each of $R_7$ and $R_8$ independently represents

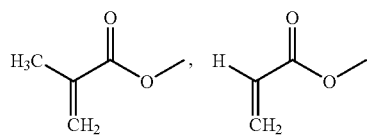

or a hydrogen atom except when $R_7$ and $R_8$ simultaneously represent a hydrogen atom.

13. The method of claim 10, wherein the liquid crystal molecules include about 1 percent to about 20 percent by weight of the first liquid crystal compound, about 30 percent to about 70 percent by weight of the second liquid crystal compound, about 10 percent to about 60 percent by weight of the third liquid crystal compound and about 0.05 percent to about 1 percent by weight of the reactive mesogen, based on the total weight of the liquid crystal molecules.

14. The method of claim 9, wherein the second liquid crystal compound comprises at least one compound selected from the group consisting of compounds represented by Chemical Formula 5, Chemical Formula 6 and Chemical Formula 7, Chemical Formula 5

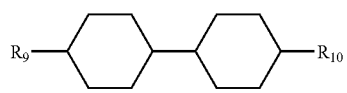

Chemical Formula 6

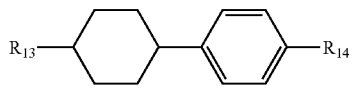

Chemical Formula 7

wherein, each of $R_9$, $R_{10}$, $R_{13}$, $R_{14}$, $R_{15}$ and $R_{16}$ independently represents an alkyl group having 1 to 12 carbon atoms, and each —$CH_2$— of $R_9$, $R_{19}$, $R_{13}$, $R_{14}$, $R_{15}$ and $R_{16}$ is independently substitutable with —O—, —CH=CH—, —CO—, —OCO— or —COO—.

15. The method of claim 9, wherein the third liquid crystal compound comprises at least one compound selected from the group consisting of compounds represented by Chemical Formula 8, Chemical Formula 9 and Chemical Formula 10, Chemical Formula 8

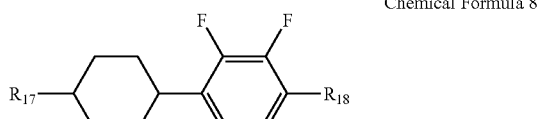

Chemical Formula 9

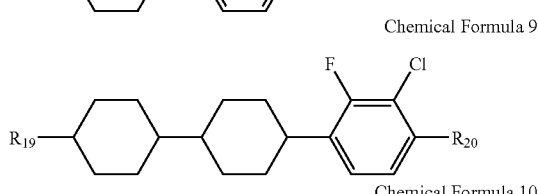

Chemical Formula 10

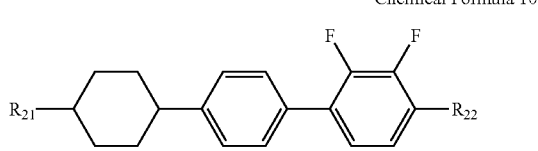

wherein, each of $R_{17}$, $R_{18}$, $R_{19}$, $R_{20}$, $R_{21}$ and $R_{22}$ independently represents an alkyl group having 1 to 12 carbon atoms, and each —$CH_2$— of $R_{17}$ to $R_{22}$ is independently substitutable with —O—, —CH=CH—, —CO—, —OCO— or —COO—.

16. The method of claim 11, wherein disposing the second substrate further comprises disposing a color filter in a region corresponding to the pixel area.

17. The method of claim 16, wherein disposing the first substrate further comprises disposing a black matrix pattern at a boundary between neighboring pixel areas.

* * * * *